US012136169B1

(12) United States Patent
Mirhosseini et al.

(10) Patent No.: US 12,136,169 B1
(45) Date of Patent: Nov. 5, 2024

(54) GENERATING A VIEW OF AN OBJECT FROM EXISTING IMAGES

(71) Applicant: Apple Inc., Cupertino, CA (US)

(72) Inventors: Seyedpooya Mirhosseini, Port Jefferson, NY (US); Seyedkoosha Mirhosseini, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 4 days.

(21) Appl. No.: 17/582,223

(22) Filed: Jan. 24, 2022

Related U.S. Application Data

(60) Provisional application No. 63/143,126, filed on Jan. 29, 2021.

(51) Int. Cl.
| | | |
|---|---|---|
| G06T 17/20 | (2006.01) | |
| G06T 1/60 | (2006.01) | |
| G06T 3/18 | (2024.01) | |
| G06T 7/55 | (2017.01) | |
| G06T 15/00 | (2011.01) | |

(52) U.S. Cl.
CPC ............ G06T 17/20 (2013.01); G06T 1/60 (2013.01); G06T 3/18 (2024.01); G06T 7/55 (2017.01); G06T 15/005 (2013.01)

(58) Field of Classification Search
CPC ......... G06T 17/20; G06T 15/005; G06T 7/55; G06T 3/0093; G06T 1/60; G06T 3/18
See application file for complete search history.

(56) References Cited

U.S. PATENT DOCUMENTS

| | | | |
|---|---|---|---|
| 9,554,126 B2 | 1/2017 | Dolim et al. | |
| 10,129,523 B2 | 11/2018 | Michail et al. | |
| 2008/0024683 A1* | 1/2008 | Damera-Venkata | H04N 9/3194 348/383 |
| 2015/0365658 A1* | 12/2015 | Devale | H04N 13/383 348/51 |
| 2016/0196641 A1* | 7/2016 | Polichroniadis | G06T 5/50 382/274 |
| 2017/0140537 A1* | 5/2017 | Jia | H04N 13/204 |
| 2019/0164010 A1* | 5/2019 | Ma | G06F 18/285 |
| 2020/0226736 A1 | 7/2020 | Kar et al. | |
| 2020/0360810 A1* | 11/2020 | Badichi | A63F 13/61 |
| 2021/0084270 A1* | 3/2021 | Christmas | G03H 1/0808 |

FOREIGN PATENT DOCUMENTS

WO       2019173672 A1    9/2019

* cited by examiner

*Primary Examiner* — Michelle Chin
(74) *Attorney, Agent, or Firm* — Fernando & Partners, LLP

(57) ABSTRACT

In some implementations, a method includes obtaining a request to view an object from a target point-of-view (POV). In some implementations, the object is represented in a plurality of images captured from corresponding POVs that are different from the target POV. In some implementations, the method includes generating respective contribution scores for the corresponding POVs indicative of respective contributions of the corresponding POVs to a view frustum of the target POV. In some implementations, the method includes determining a sequence in which the plurality of images is ordered based on the respective contribution scores for the corresponding POVs. In some implementations, the method includes synthesizing a new view of the object corresponding to the target POV by performing a warping operation to the plurality of images in accordance with the sequence.

20 Claims, 12 Drawing Sheets

GENERATING A VIEW OF AN OBJECT FROM EXISTING IMAGES

CROSS-REFERENCE TO RELATED APPLICATION

This application claims the benefit of U.S. Provisional Patent App. No. 63/143,126, filed on Jan. 29, 2021, which is incorporated by reference in its entirety.

TECHNICAL FIELD

The present disclosure generally relates to generating a new view of an object from existing images of the object captured from different views.

BACKGROUND

Some devices are capable of presenting images of an object. Presenting images that may have been captured from different points of view allows a user to view the object from different perspectives. However, the perspectives from which the user can view the object are limited by the images because most devices are limited to presenting the object from the points of view corresponding to the images.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

Figure 1A:
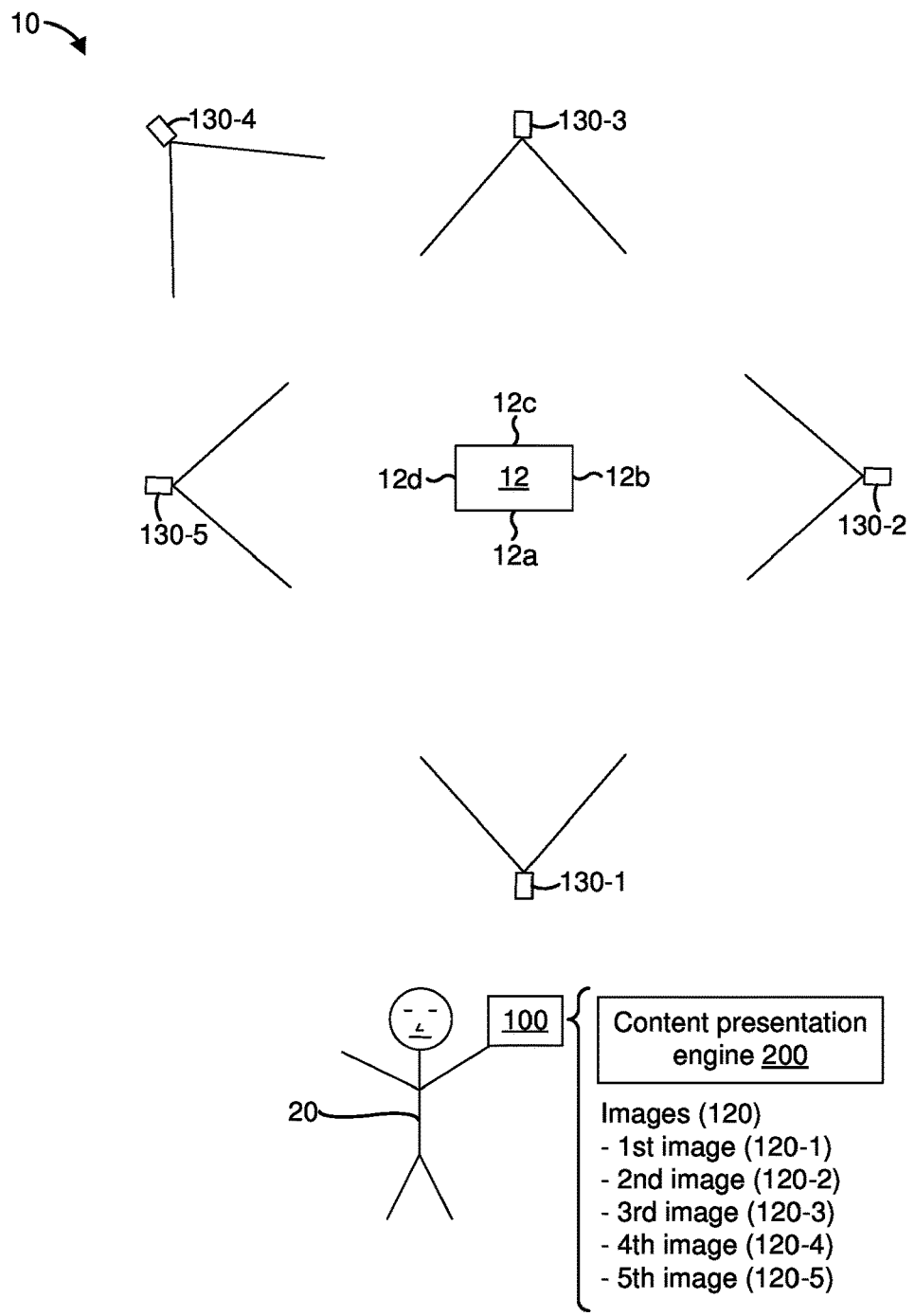
FIGS. 1A-1F are diagrams of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for synthesizing a new view of an object from existing images of the object. In some implementations, a device includes a non-transitory memory and one or more processors coupled with the non-transitory memory. In some implementations, a method includes obtaining a request to view an object from a target point-of-view (POV). In some implementations, the object is represented in a plurality of images captured from corresponding POVs that are different from the target POV. In some implementations, the method includes generating respective contribution scores for the corresponding POVs indicative of respective contributions of the corresponding POVs to a view frustum of the target POV. In some implementations, the method includes determining a sequence in which the plurality of images is ordered based on the respective contribution scores for the corresponding POVs. In some implementations, the method includes synthesizing a new view of the object corresponding to the target POV by performing a warping operation to the plurality of images in accordance with the sequence.

In accordance with some implementations, a device includes one or more processors, a non-transitory memory, and one or more programs. In some implementations, the one or more programs are stored in the non-transitory memory and are executed by the one or more processors. In some implementations, the one or more programs include instructions for performing or causing performance of any of the methods described herein. In accordance with some implementations, a non-transitory computer readable storage medium has stored therein instructions that, when executed by one or more processors of a device, cause the device to perform or cause performance of any of the methods described herein. In accordance with some implementations, a device includes one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices and circuits have not been described in exhaustive detail so as not to obscure more pertinent aspects of the example implementations described herein.

A physical environment refers to a physical world that people can sense and/or interact with without aid of electronic devices. The physical environment may include physical features such as a physical surface or a physical object. For example, the physical environment corresponds to a physical park that includes physical trees, physical buildings, and physical people. People can directly sense and/or interact with the physical environment such as through sight, touch, hearing, taste, and smell. In contrast, an extended reality (XR) environment refers to a wholly or partially simulated environment that people sense and/or interact with via an electronic device. For example, the XR environment may include augmented reality (AR) content, mixed reality (MR) content, virtual reality (VR) content, and/or the like. With an XR system, a subset of a person's physical motions, or representations thereof, are tracked, and, in response, one or more characteristics of one or more virtual objects simulated in the XR environment are adjusted in a manner that comports with at least one law of physics. As one example, the XR system may detect head movement and, in response, adjust graphical content and an acoustic field presented to the person in a manner similar to how such views and sounds would change in a physical environment. As another example, the XR system may detect movement of the electronic device presenting the XR environment (e.g., a mobile phone, a tablet, a laptop, or the like) and, in response, adjust graphical content and an acoustic field presented to the person in a manner similar to how such views and sounds would change in a physical environment. In some situations (e.g., for accessibility reasons), the XR system may adjust characteristic(s) of graphical content in the XR environment in response to representations of physical motions (e.g., vocal commands).

There are many different types of electronic systems that enable a person to sense and/or interact with various XR environments. Examples include head mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mountable system may have one or more speaker(s) and an integrated opaque display. Alternatively, a head mountable system may be configured to accept an external opaque display (e.g., a smartphone). The head mountable system may incorporate one or more imaging sensors to capture images or video of the physical environment, and/or one or more microphones to capture audio of the physical environment. Rather than an opaque display, a head mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In some implementations, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Generating a new point-of-view (POV) from existing POVs is a resource-intensive operation. Some devices generate a new POV by re-projecting existing POVs to a target POV. Re-projecting existing POVs to a target POV may result in multiple values for each pixel in the target POV. Hence, a decision function is needed to determine a value for each pixel in the new POV based on the multiple re-projected values. However, decision functions are resource intensive (e.g., memory intensive) and are difficult to implement on a portable device with limited memory. In particular, inputting re-projection values from all existing POVs is resource-intensive, for example, because it takes the decision function more time to determine the value for each pixel. Furthermore, inputting the re-projection values from the existing POVs into the decision function in a fixed order results in more resources being utilized.

The present disclosure provides methods, systems, and/or devices for synthesizing a target POV by ordering existing images based on respective contribution scores indicating contribution of corresponding POVs to a view frustum of the target POV, and applying warping and blending operations to the images based on the order. The device can discard some of the existing images in response to their respective contribution scores being less than a threshold in order to reduce a number of warping and blending operations thereby conserving computing resources. Additionally or alternatively, the device can discard re-projection values from some existing POVs in order to reduce the number of re-projection values that are provided to the decision function as inputs. Reducing the number of re-projection values that are provided to the decision function as inputs tends to reduce a latency of the decision function thereby enhancing operability of the device.

FIG. 1A is a block diagram of an example operating environment 10 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 10 includes an electronic device 100 and a content presentation engine 200. In some implementations, the electronic device 100 includes a handheld computing device that can be held by a user 20. For example, in some implementations, the electronic device 100 includes a smartphone, a tablet, a media player, a laptop, or the like. In some implementations, the electronic device 100 includes a wearable computing device that can be worn by the user 20. For example, in some implementations, the electronic device 100 includes a head-mountable device (HMD) or an electronic watch.

In the example of FIG. 1A, the content presentation engine 200 resides at the electronic device 100. For example, the electronic device 100 implements the content presentation engine 200. In some implementations, the electronic device 100 includes a set of computer-readable instructions corresponding to the content presentation engine 200. Although the content presentation engine 200 is shown as being integrated into the electronic device 100, in some implementations, the content presentation engine 200 is separate from the electronic device 100. For example, in some implementations, the content presentation engine 200 resides at another device (e.g., at a controller, a server or a cloud computing platform).

In various implementations, the operating environment 10 includes an object 12 (e.g., a physical article). In some implementations, the object 12 includes a front portion 12a, a right portion 12b, a rear portion 12c and a left portion 12d. In the example of FIG. 1A, the object 110 is a cube, and the front portion 12a, the right portion 12b, the rear portion 12c and the left portion 12d are different faces of the cube.

In some implementations, the electronic device 100 stores a set of one or more images 120 ("images 120", hereinafter for the sake of brevity) that include two-dimensional (2D) representations of the object 12. In some implementations, the electronic device 100 includes an image sensor (e.g., a camera) that captures the images 120. In some implementations, the images 120 are captured from different points of view. For example, in some implementations, the images 120 include a first image 120-1 that is captured from a first point-of-view (POV) 130-1, a second image 120-2 that is captured from a second POV 130-2, a third image 120-3 that is captured from a third POV 130-3, a fourth image 120-4 that is captured from a fourth POV 130-4 and a fifth image 120-5 that is captured from a fifth POV 130-5.

In various implementations, the content presentation engine 200 uses the images 120 to generate a three-dimensional (3D) virtual object that represents the object 12. In some implementations, the content presentation engine 200 uses the images 120 to generate and present views of the object 12 that are different from the POVs 130-1, 130-2, 130-3, 130-4 and 130-5. More generally, in various implementations, the content presentation engine 200 generates and presents a new view of the object 12 based on existing views corresponding to the images 120.

Figure 1B:
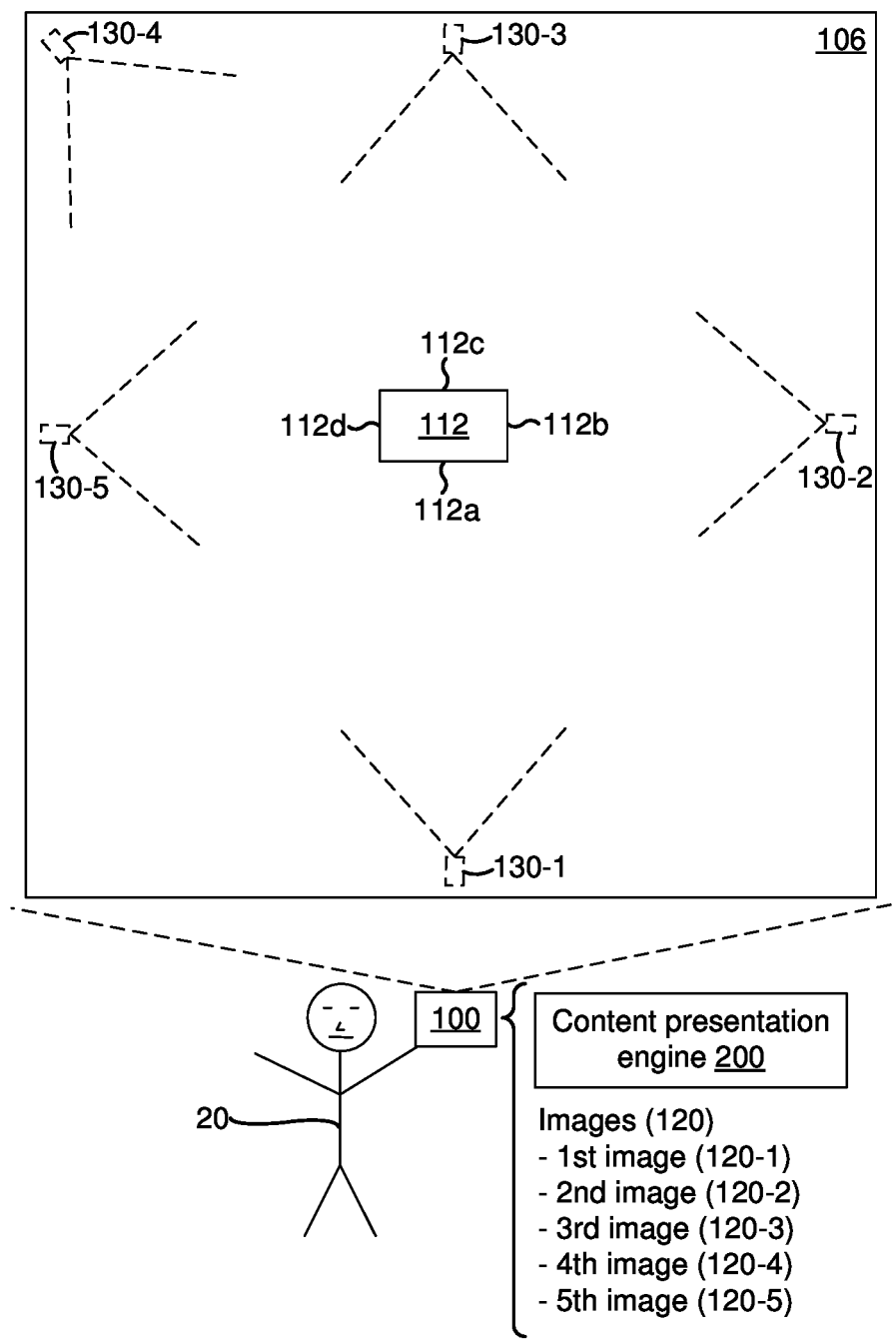

Referring to FIG. 1B, in some implementations, the electronic device 100 presents an extended reality (XR) environment 106. In some implementations, the XR environment 106 is referred to as a computer graphics environment. In some implementations, the XR environment 106 is referred to as a graphical environment. In some implementations, the electronic device 100 generates the XR environment 106. Alternatively, in some implementations, the electronic device 100 receives the XR environment 106 from another device that generated the XR environment 106.

In some implementations, the XR environment 106 includes a virtual environment that is a simulated replacement of a physical environment. In some implementations, the XR environment 106 is synthesized by the electronic device 100. In such implementations, the XR environment 106 is different from a physical environment in which the electronic device 100 is located. In some implementations, the XR environment 106 includes an augmented environment that is a modified version of a physical environment. For example, in some implementations, the electronic device 100 modifies (e.g., augments) the physical environment in which the electronic device 100 is located to generate the XR environment 106. In some implementations, the electronic device 100 generates the XR environment 106 by simulating a replica of the physical environment in which the electronic device 100 is located. In some implementations, the electronic device 100 generates the XR environment 106 by removing and/or adding items from the simulated replica of the physical environment in which the electronic device 100 is located.

In some implementations, the XR environment 106 includes various 3D virtual objects such as an XR object 112 ("object 112", hereinafter for the sake of brevity). In various implementations, the content presentation engine 200 generates the object 112 based on the images 120 depicting the object 12 shown in FIG. 1A. As such, the object 112 is within a similarity threshold of the object 12 shown in FIG. 1A. For example, the object 112 includes a front portion 112a, a right portion 112b, a rear portion 112c and a left portion 112d. Since the object 12 was photographed from the POVs 130-1, 130-2, 130-3, 130-4 and 130-5, the electronic device 100 can present the object 112 from the POVs 130-1, 130-2, 130-3, 130-4 and 130-5 by displaying the images 120-1, 120-2, 120-3, 120-4 and 120-5, respectively. However, when the user 20 requests to view the object 112 from a new POV, the content presentation engine 200 synthesizes the new POV based on the images 120.

Figure 1C:
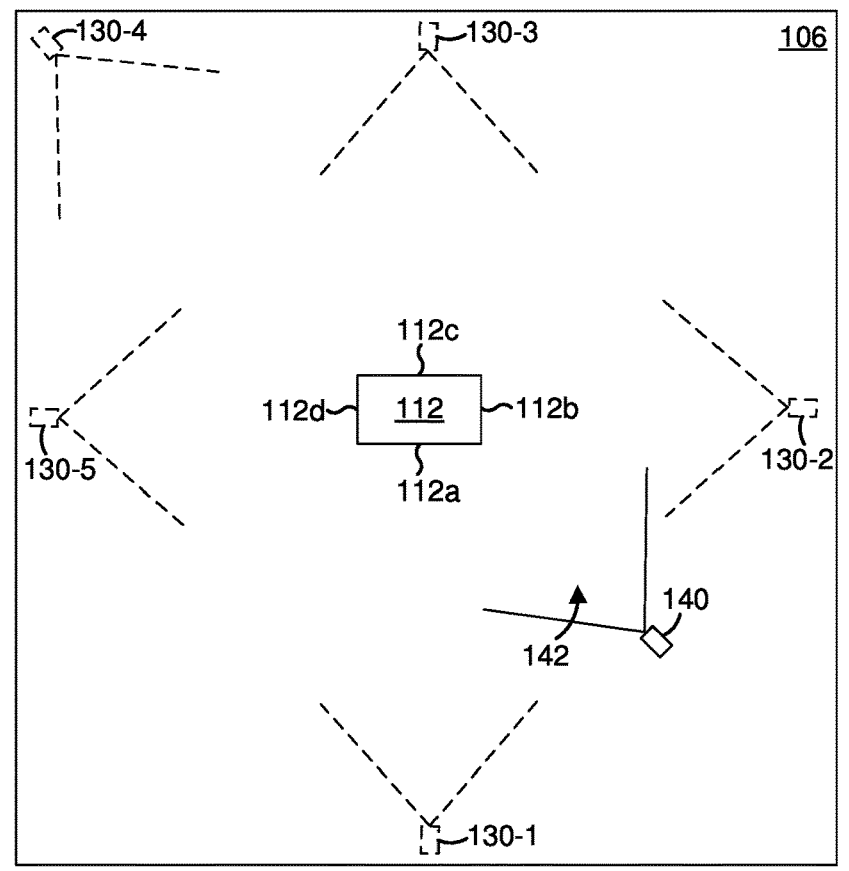
Figure 1C:
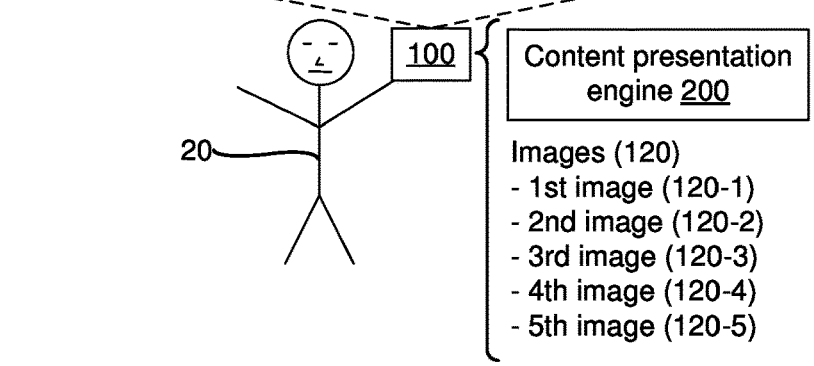

Referring to FIG. 1C, the electronic device 100 obtains a request to display the object 112 from a first target POV 140 with a view frustum 142. In some implementations, the request includes a voice command spoken by the user 20. In some implementations, the request includes detecting a manipulation of a virtual camera within the XR environment 106.

Figure 1D:
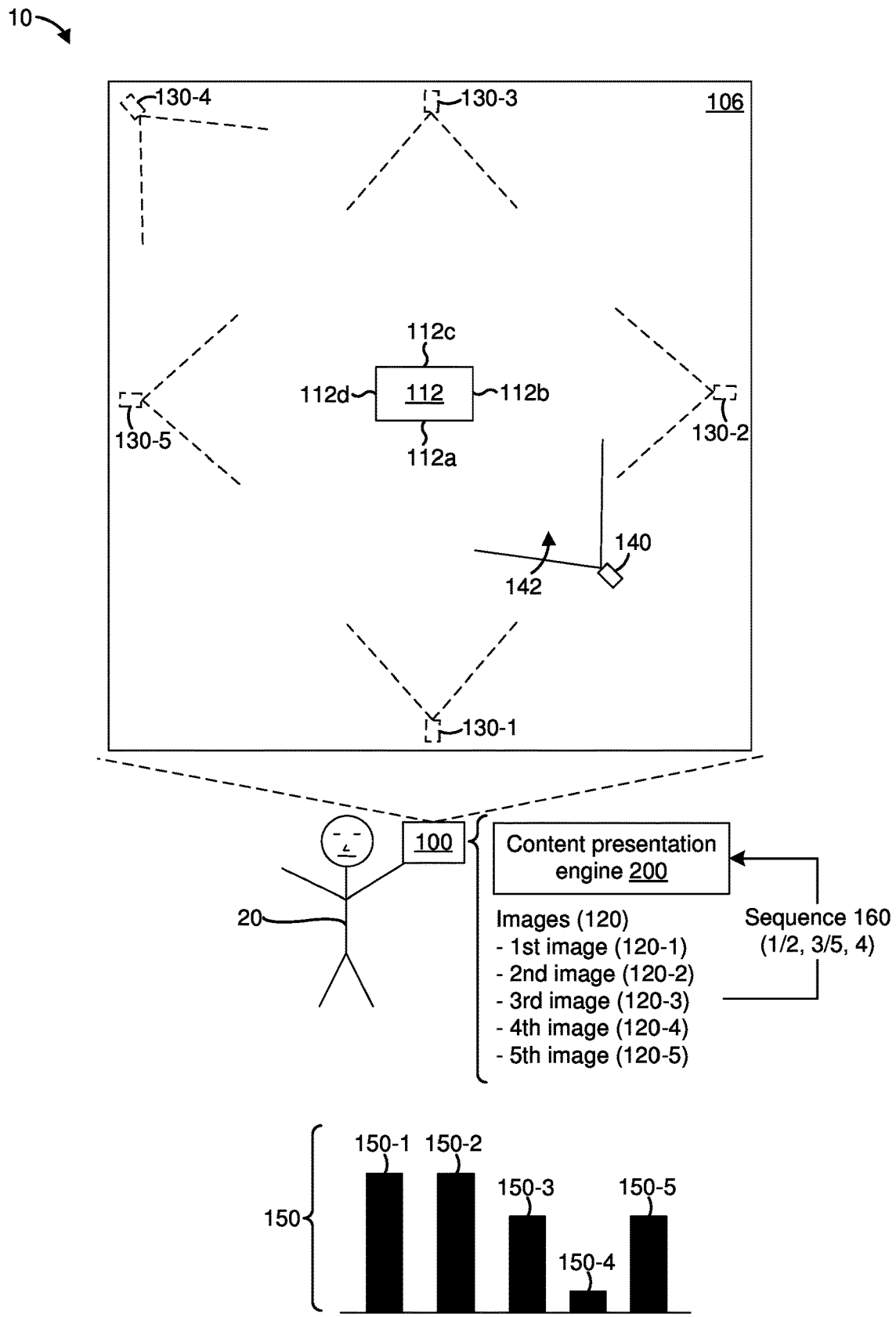

Referring to FIG. 1D, in response to obtaining the request to display the object 112 from the first target POV 140, the content presentation engine 200 generates respective contribution scores 150 for the POVs associated with the images 120. For example, as shown in FIG. 1D, the content presentation engine 200 generates a first contribution score 150-1 for the first POV 130-1, a second contribution score 150-2 for the second POV 130-2, a third contribution score 150-3 for the third POV 130-3, a fourth contribution score 150-4 for the fourth POV 130-4, and a fifth contribution score 150-5 for the fifth POV 130-5. In various implementations, the contribution scores 150 indicate respective contributions of the POVs associated with the images 120 to a view frustum 142 of the first target POV 140. For example, the first contribution score 150-1 indicates a first contribution of the first POV 130-1 to the view frustum 142 of the first target POV 140. Similarly, the second contribution score 150-2 indicates a second contribution of the second POV 130-2 to the view frustum 142 of the first target POV 140. The third contribution score 150-3 indicates a third contribution of the third POV 130-3 to the view frustum 142 of the first target POV 140. The fourth contribution score 150-4 indicates a fourth contribution of the fourth POV 130-4 to the view frustum 142 of the first target POV 140. The fifth contribution score 150-5 indicates a fifth contribution of the fifth POV 130-5 to the view frustum 142 of the first target POV 140.

In some implementations, the contribution scores 150 are a function of amounts of overlap between view frustums of the corresponding POVs and the first target POV 140. In the example of FIG. 1D, the first contribution score 150-1 is greater than the third contribution score 150-3 because an amount of overlap between the view frustum of the first POV 130-1 and the view frustum 142 of the first target POV 140 is greater than an amount of overlap between the view frustum of the third POV 130-3 and the view frustum 142 of the first target POV 140. Similarly, the third contribution score 150-3 is greater than the fourth contribution score 150-4 because an amount of overlap between the view frustum of the third POV 130-3 and the view frustum 142 of the first target POV 140 is greater than an amount of overlap between the view frustum of the fourth POV 130-4 and the view frustum 142 of the first target POV 140.

In various implementations, the content presentation engine 200 determines a first sequence 160 in which the images 120 are ordered based on the contribution scores 150. In various implementations, the content presentation engine 200 generates a new view of the object 112 from the first target POV 140 by performing a warping operation and a blending operation on the images 120 in the order specified by the first sequence 160. In the example of FIG. 1D, the content presentation engine 200 generates a new view of the object 112 by performing a warping operation and a blending operation on the first image 120-1 or the second image 120-2 before performing the warping operation and the blending operation on the third image 120-3 or the fifth image 120-5 because the first image 120-1 and the second image 120-2 appear before the third image 120-3 and the fifth image 120-5 in the first sequence 160. Similarly, the content presentation engine 200 performs a warping operation and a blending operation on the third image 120-3 and the fifth image 120-5 before performing the warping operation and the blending operation on the fourth image 120-4 because the third image 120-3 and the fifth image 120-5 appear before the fourth image 120-4 in the first sequence 160.

Figure 1E:
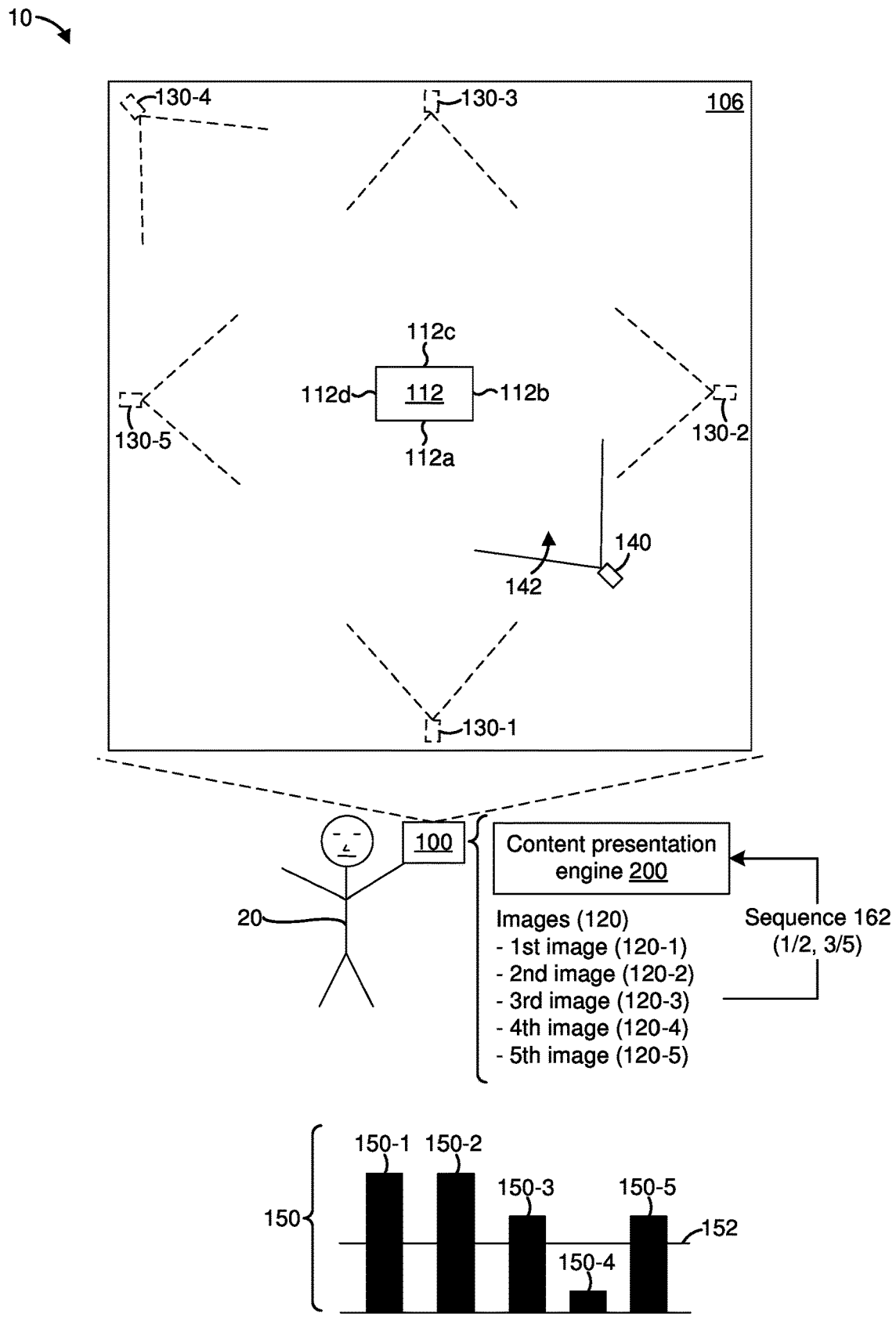

Referring to FIG. 1E, in some implementations, the content presentation engine 200 forgoes performing warping and blending operations on images with contribution scores that are lower than a threshold contribution score 152. In the example of FIG. 1E, the fourth contribution score 150-4 is lower than the threshold contribution score 152. As such, the content presentation engine 200 forgoes performing a warping operation and a blending operation on the fourth image 120-4. As shown in FIG. 1E, the content presentation engine 200 generates a second sequence 162 that does not include the fourth image 120-4 because the fourth contribution score 150-4 is lower than the threshold contribution score 152. In the example of FIG. 1E, the content presentation engine 200 performs warping and blending operations on the first image 120-1 and the second image 120-2 prior to performing warping and blending operations on the third image 120-3 and the fifth image 120-5 because the first image 120-1 and the second image 120-2 appear before the third image 120-3 and the fifth image 120-5 in the second sequence 162.

Figure 1F:
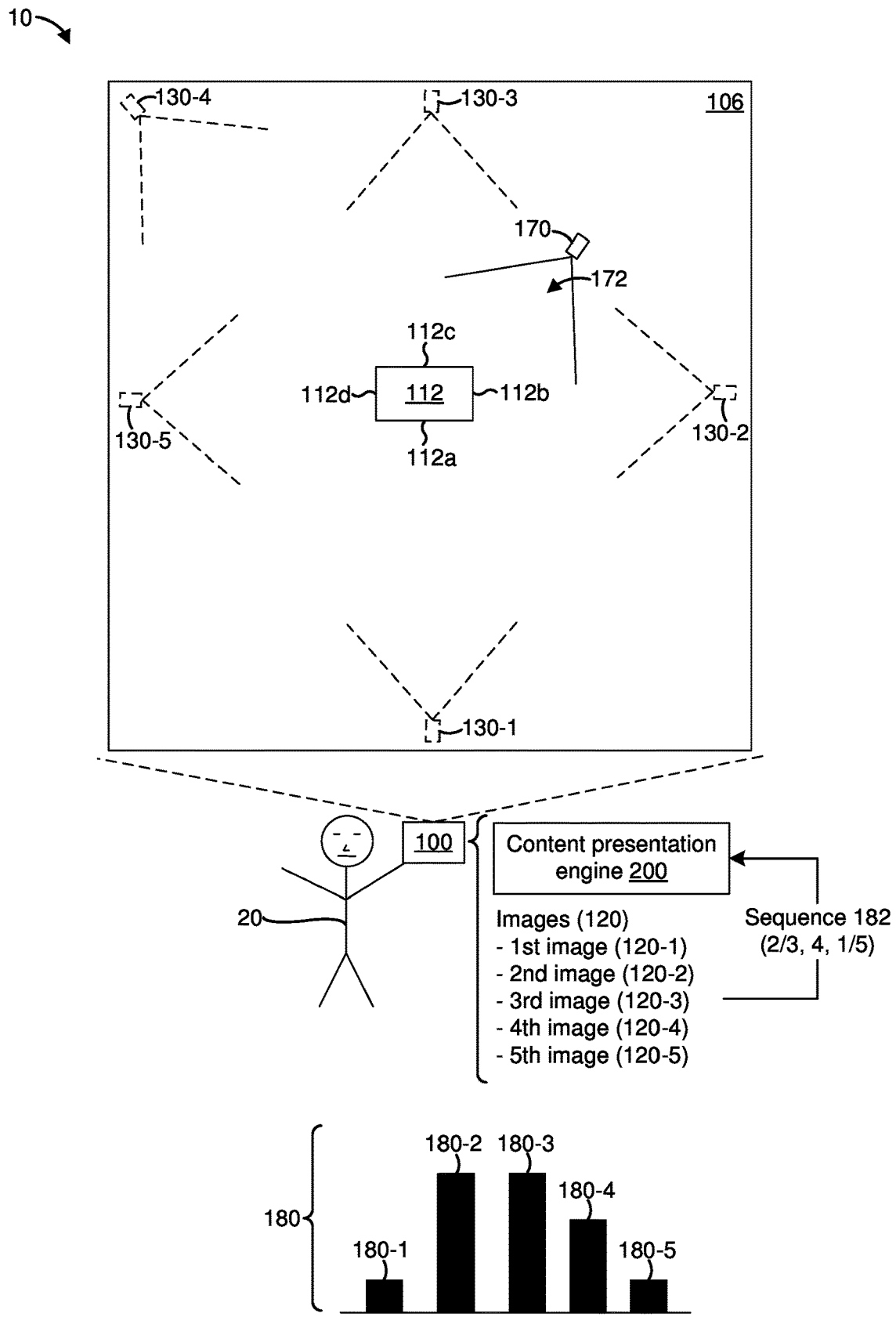

Referring to FIG. 1F, the electronic device 100 obtains a request to display the object 112 from a second target POV 170 with a view frustum 172. In response to obtaining the request to display the object 112 from the second target POV 170, the content presentation engine 200 generates a second set of contribution scores 180 for the POVs 130-1, 130-2, 130-3, 130-4 and 130-5 associated with the images 120. For example, as shown in FIG. 1F, the content presentation engine 200 generates a first contribution score 180-1 for the first POV 130-1, a second contribution score 180-2 for the second POV 130-2, a third contribution score 180-3 for the third POV 130-3, a fourth contribution score 180-4 for the fourth POV 130-4, and a fifth contribution score 180-5 for the fifth POV 130-5. In various implementations, the second set of contribution scores 180 indicate respective contributions of the POVs associated with the images 120 to the view frustum 172 of the second target POV 170. In some implementations, the second set of contribution scores 180 indicate respective overlaps between view frustums of the existing POVs associated with the images 120 and the view frustum 172 of the second target POV 170.

In various implementations, the content presentation engine 200 determines a third sequence 182 in which the images 120 are ordered based on the second set of contribution scores 180. In various implementations, the content presentation engine 200 generates a new view of the object 112 from the second target POV 170 by performing a warping operation and a blending operation on the images 120 in the order specified by the third sequence 182. In the example of FIG. 1F, the content presentation engine 200 generates a new view of the object 112 by performing a warping operation and a blending operation on the second image 120-2 or the third image 120-3 before performing the warping operation and the blending operation on the fourth image 120-4 because the second image 120-2 and the third image 120-3 appear before the fourth image 120-4 in the third sequence 182. Similarly, the content presentation engine 200 performs a warping operation and a blending operation on the fourth image 120-4 before performing the warping operation and the blending operation on the first image 120-1 and the fifth image 120-5 because the fourth image 120-4 appears before the first image 120-1 and the fifth image 120-5 in the third sequence 182.

In various implementations, the operations (e.g., warping and blending operations) performed by the content presentation engine 200 in order to generate the new views corresponding to the first target POV 140 shown in FIGS. 1C-1E and the second target POV 170 shown in FIG. 1F are referred to as hole-filling operations or gap-filling operations because they compensate for the holes or gaps in the images 120 (e.g., for physical areas not depicted in the images 120). In some implementations, the hole-filling operations allow the content presentation engine 200 to compensate for lack of image data depicting certain portions of the object 12. In various implementations, the operations performed by the content presentation engine 200 allow the user 20 to view the object 112 from new POVs that are not captured by the images 120.

In some implementations, the electronic device 100 includes or is replaced by a head-mountable device (HMD) that is worn by the user 20. In some implementations, the HMD includes an integrated display (e.g., a built-in display) that displays the XR environment 106. In some implementations, the HMD includes a head-mountable enclosure. In various implementations, the head-mountable enclosure includes an attachment region to which another device with a display can be attached. For example, in some implementations, the electronic device 100 can be attached to the head-mountable enclosure. In various implementations, the head-mountable enclosure is shaped to form a receptacle for receiving another device that includes a display (e.g., the electronic device 100). For example, in some implementations, the electronic device 100 slides/snaps into or otherwise attaches to the head-mountable enclosure. In some implementations, the display of the device attached to the head-mountable enclosure presents (e.g., displays) the XR environment 106. In various implementations, examples of the electronic device 100 include smartphones, tablets, media players, laptops, etc.

Figure 2A:
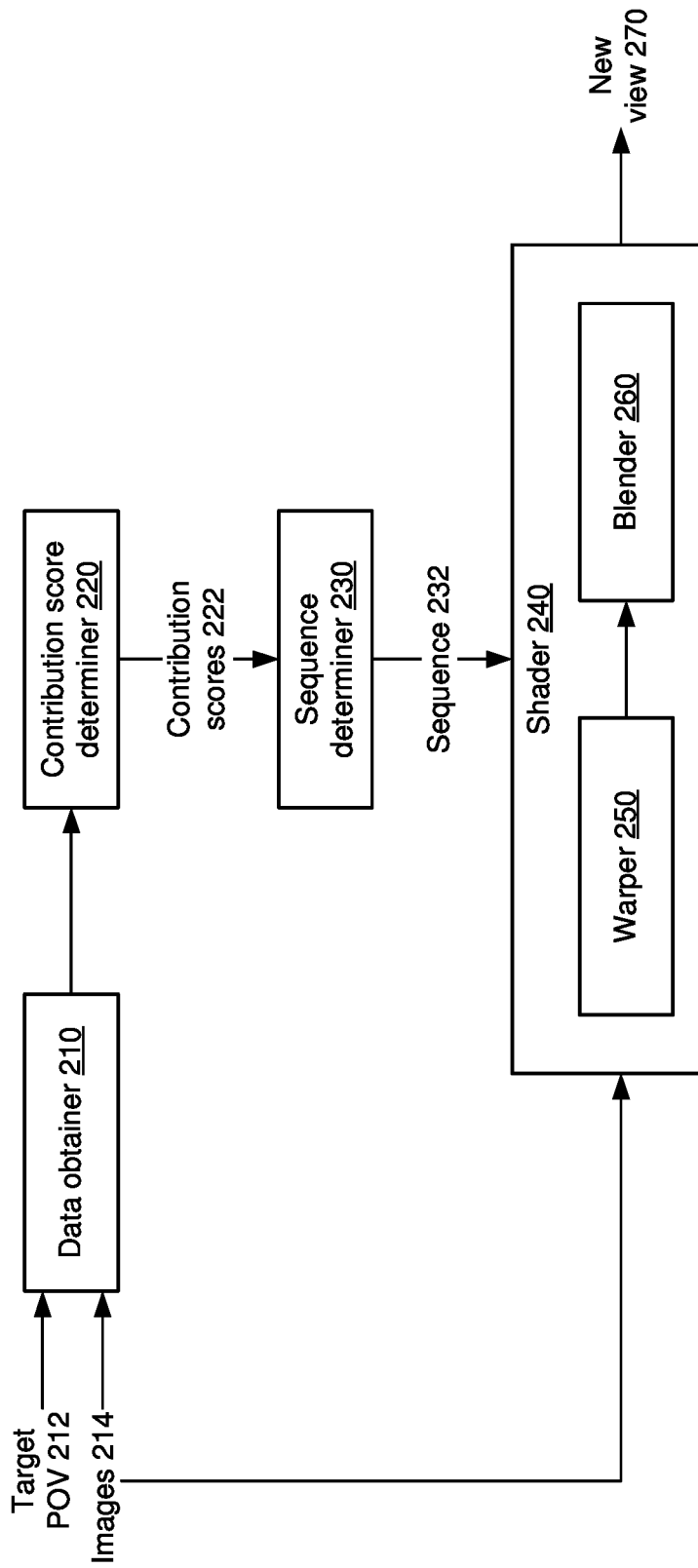
FIG. 2A is a block diagram of a content presentation engine in accordance with some implementations.

FIG. 2A illustrates a block diagram of the content presentation engine 200 in accordance with some implementations. In some implementations, the content presentation engine 200 includes a data obtainer 210, a contribution score determiner 220, a sequence determiner 230, and a shader 240 that includes a warper 250 and a blender 260.

In various implementations, the data obtainer 210 obtains a request to view an object from a target POV 212 (e.g., the first target POV 140 shown in FIGS. 1C-1E or the second target POV 170 shown in FIG. 1F). In some implementations, the data obtainer 210 detects a user input that specifies the target POV 212 (e.g., a voice command or a movement of a virtual rig focused on the object). In some implementations, the object is represented in a set of images 214 that are captured from POVs that are different from the target POV 212 (e.g., the images 120 captured from the POVs 130-1, 130-2, . . . , and 130-5 shown in FIGS. 1A-1F). In some implementations, the data obtainer 210 receives the images 214 from an image sensor (e.g., a camera) that captures the images 214. In some implementations, the data obtainer 210 accesses a non-transitory memory that stores the images 214 and retrieves the images 214 from the non-transitory memory.

In various implementations, the contribution score determiner 220 generates (e.g., computes) contribution scores 222 for POVs associated with the images 214 (e.g., the first set of contribution scores 150 shown in FIGS. 1D and 1E, and/or the second set of contribution scores 180 shown in FIG. 1F). In some implementations, the contribution scores 222 indicate respective contributions of POVs associated with the images 214 to a view frustum of the target POV 212. In some implementations, the contribution scores 222 indicate respective amounts of overlap between view frustums of POVs associated with the images 214 and a view frustum of the target POV 212. In some implementations, the contribution scores 222 indicate how closely the POVs associated with the images 214 match the target POV 212.

In various implementations, the sequence determiner 230 determines a sequence 232 for the images 214 based on the contribution scores 222. In some implementations, the sequence determiner 230 orders the images 214 such that images 214 that are associated with greater contribution scores 222 appear towards a beginning of the sequence 232 and images 214 that are associated with lower contribution scores 222 appear towards an end of the sequence 232. For example, as shown in FIG. 1D, the sequence determiner 230 ordered the images 120 in the first sequence 160 in a descending order of their respective contribution scores 150.

In various implementations, the shader 240 generates a new view 270 by performing warping and blending operations on the images 214 in an order specified by the sequence 232. In some implementations, for each of the images 214, the warper 250 performs a warping operation on the image and the blender 260 subsequently performs a blending operation on the image. In some implementations, the warper 250 performs the warping operation on an image by re-projecting a set of pixel values associated with a source plane in the image onto a target plane in the target POV 212. In some implementations, re-projecting pixel values from the source plane to the target plane includes determining re-projection values for pixels of the target plane. In some implementations, the shader 240 (e.g., the blender 260) includes a decision function that selects pixel values for a target plane in the target POV 212 from sets of re-projection values. In various implementations, the shader 240 provides the new view 270 (e.g., pixel values corresponding to the new view 270) to a rendering and display pipeline that displays the new view 270 on a display. In various implementations, the content presentation engine 200 (e.g., the shader 240) uses tile memory (e.g., a tile memory structure) to display the new view 270.

Figure 2B:
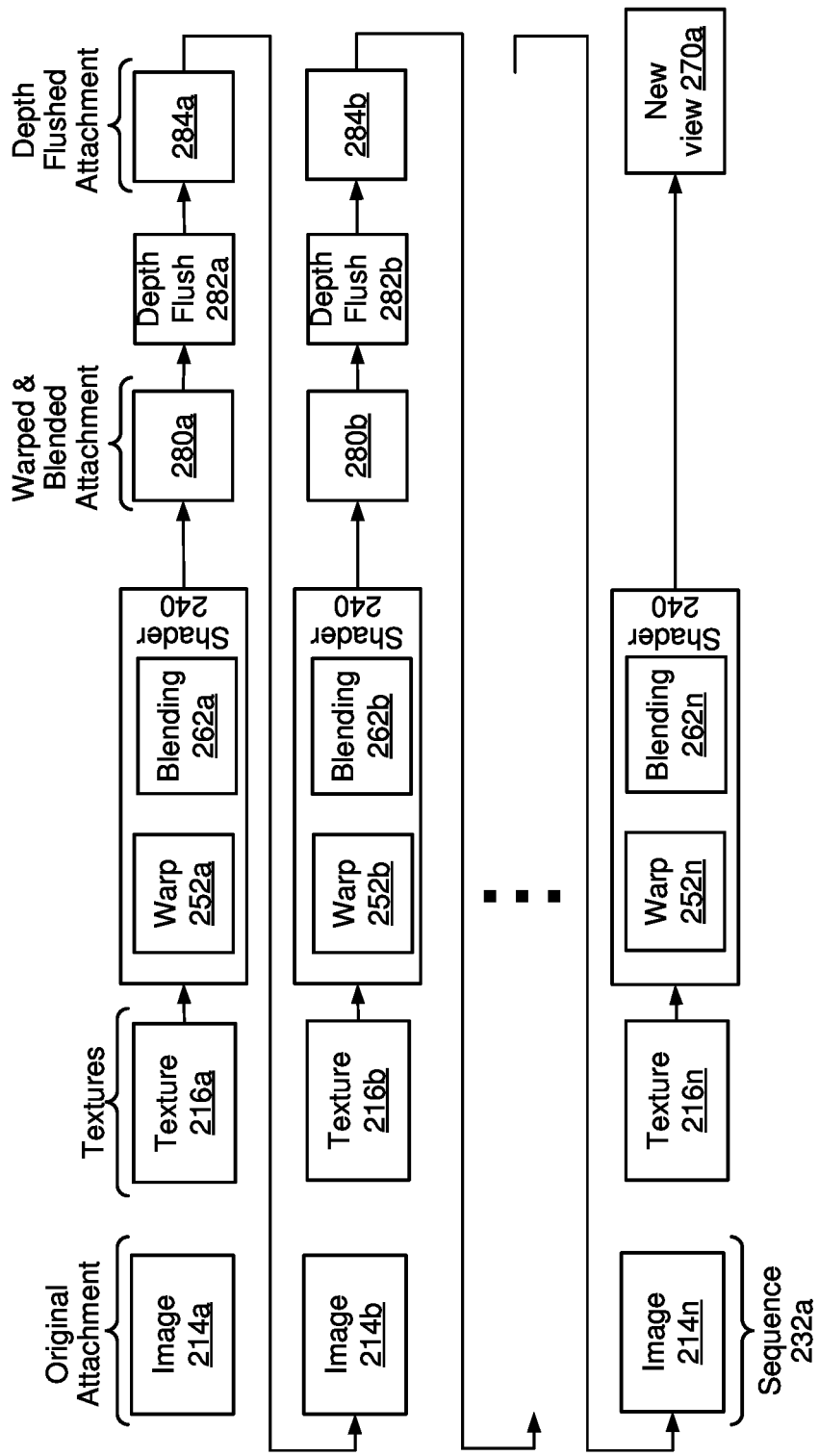
FIG. 2B is a diagram that illustrates an example new view being generated in accordance with some implementations.

FIG. 2B is a diagram that illustrates a set of operations that the shader 240 performs in order to synthesize an example new view 270a in accordance with some implementations. In the example of FIG. 2B, the shader 240 obtains a sequence 232a that specifies an order for the images 214. For example, the sequence 232a specifies that the shader 240 is to perform warping and blending operations on a first image 214a before performing warping and blending operations on a second image 214b. As shown in FIG. 2B, the shader 240 obtains the first image 214a and a first set of textures 216a associated with the first image 214a as inputs. In some implementations, the warper 250 performs a first warping operation 252a on the first image 214a and the blender 260 subsequently performs a first blending operation 262a on the first image 214a.

As can be seen in FIG. 2B, in some implementations, performing the first warping operation 252a and the first blending operation 262a on the first image 214a results in a first warped and blended attachment 280a ("a first shaded attachment 280a", hereinafter for the sake of brevity). In some implementations, the content presentation engine 200 (e.g., the shader 240) performs a depth flush operation on the image after performing the warping and the blending operations. For example, as shown in FIG. 2B, the content presentation engine 200 performs a first depth flush operation 282a on the first shaded attachment 280a in order to generate a first depth flushed attachment 284a. In some implementations, the first depth flush operation 282a allows the content presentation engine 200 to perform the next set of warping and blending operations. In various implementations, the first shaded attachment 280a is a modified version of the first image 214a, and the first depth flushed attachment 284a is a modified version of the first shaded attachment 280a.

As shown in FIG. 2B, the shader 240 obtains the second image 214b and a second set of textures 216b associated with the second image 214b as inputs. In some implementations, the warper 250 performs a second warping operation 252b on the second image 214b and the blender 260 subsequently performs a second blending operation 262b. As shown in FIG. 2B, the second blending operation 262b uses the first depth flushed attachment 284a and the second image 214b. In some implementations, performing the second blending operation 262b includes blending pixels values generated by the second warping operation 252b with pixel values generated by the first blending operation 262a. More generally, in various implementations, a blending operation includes blending old pixel values with new pixel values. In some implementations, the blending operation uses a decision function to determine pixel values based on old pixel values and new pixel values.

As can be seen in FIG. 2B, in some implementations, performing the second warping operation 252b and the second blending operation 262b results in a second warped and blended attachment 280b ("a second shaded attachment 280b", hereinafter for the sake of brevity). In some implementations, the content presentation engine 200 (e.g., the shader 240) performs a second depth flush operation 282b on the second shaded attachment 280b in order to generate a second depth flushed attachment 284b. In some implementations, the second depth flush operation 282b allows the content presentation engine 200 to perform the next set of warping and blending operations. In various implementations, the second shaded attachment 280b is a modified version of the first depth flushed attachment 284a, and the second depth flushed attachment 284b is a modified version of the second shaded attachment 280b.

As shown in FIG. 2B, after performing various warping and blending operations on images identified in the sequence 232a, the shader 240 obtains an nth image 214n and an nth set of textures 216n associated with the nth image 214n as inputs. In some implementations, the warper 250 performs an nth warping operation 252n on the nth image 214n and the blender 260 subsequently performs an nth blending operation 262n in order to generate the new view 270a.

Figure 2C:
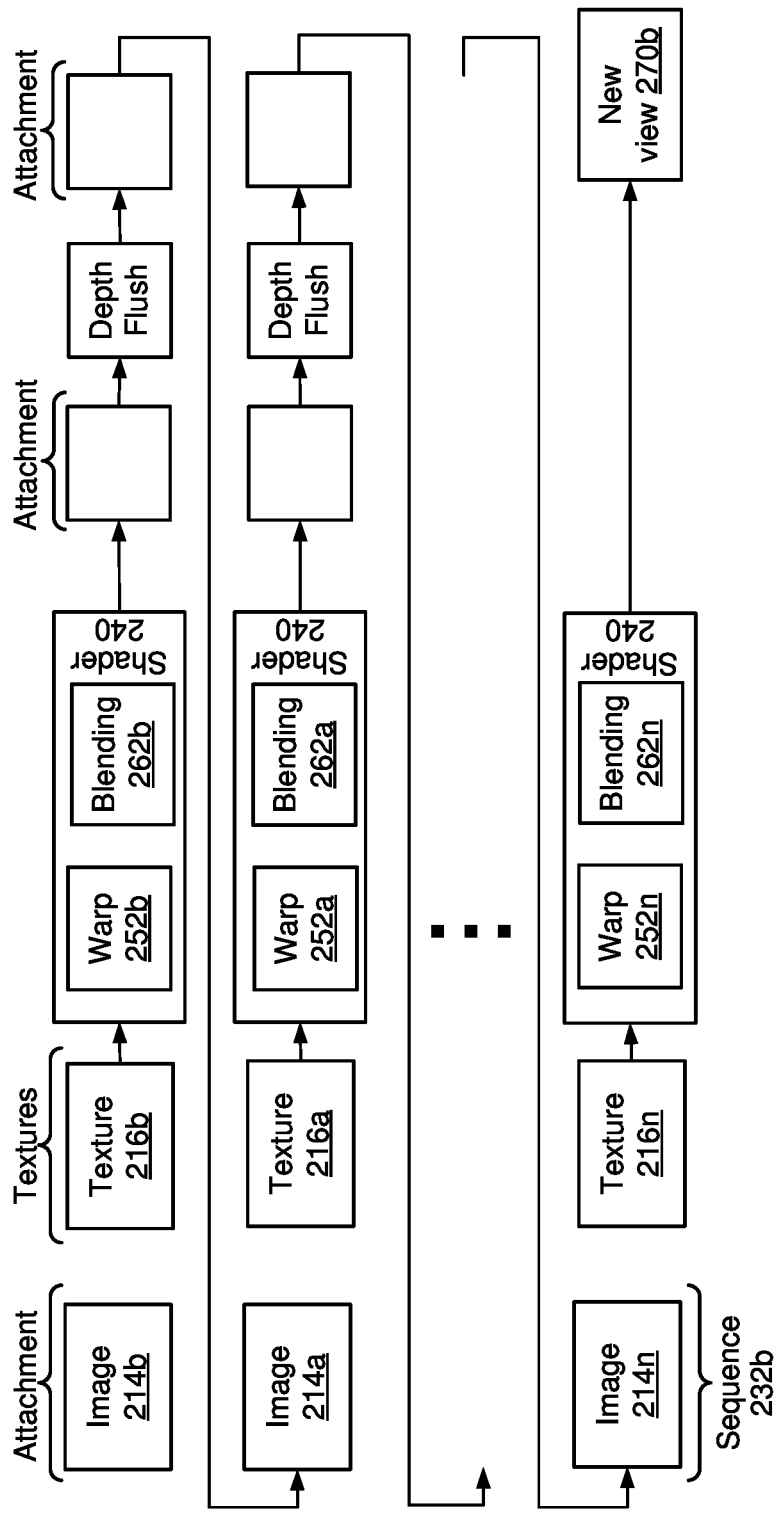
FIG. 2C is a diagram that illustrates another example new view being generated in accordance with some implementations.

FIG. 2C is a diagram that illustrates a set of operations that the shader 240 performs in order to synthesize another example new view 270b in accordance with some implementations. In the example of FIG. 2B, the shader 240 obtains a sequence 232b that specifies an order for the images 214. The sequence 232b is different from the sequence 232a shown in FIG. 2B, for example, because the target POV in FIG. 2B is different from the target POV for FIG. 2C. The sequence 232b specifies that the shader 240 is to perform warping and blending operations on the second image 214b before performing warping and blending operations on the first image 214a. As shown in FIG. 2C, the content presentation engine 200 generates the new view 270b after performing various warping and blending operations on the images 214 in accordance with the sequence 232b.

Figure 2D:
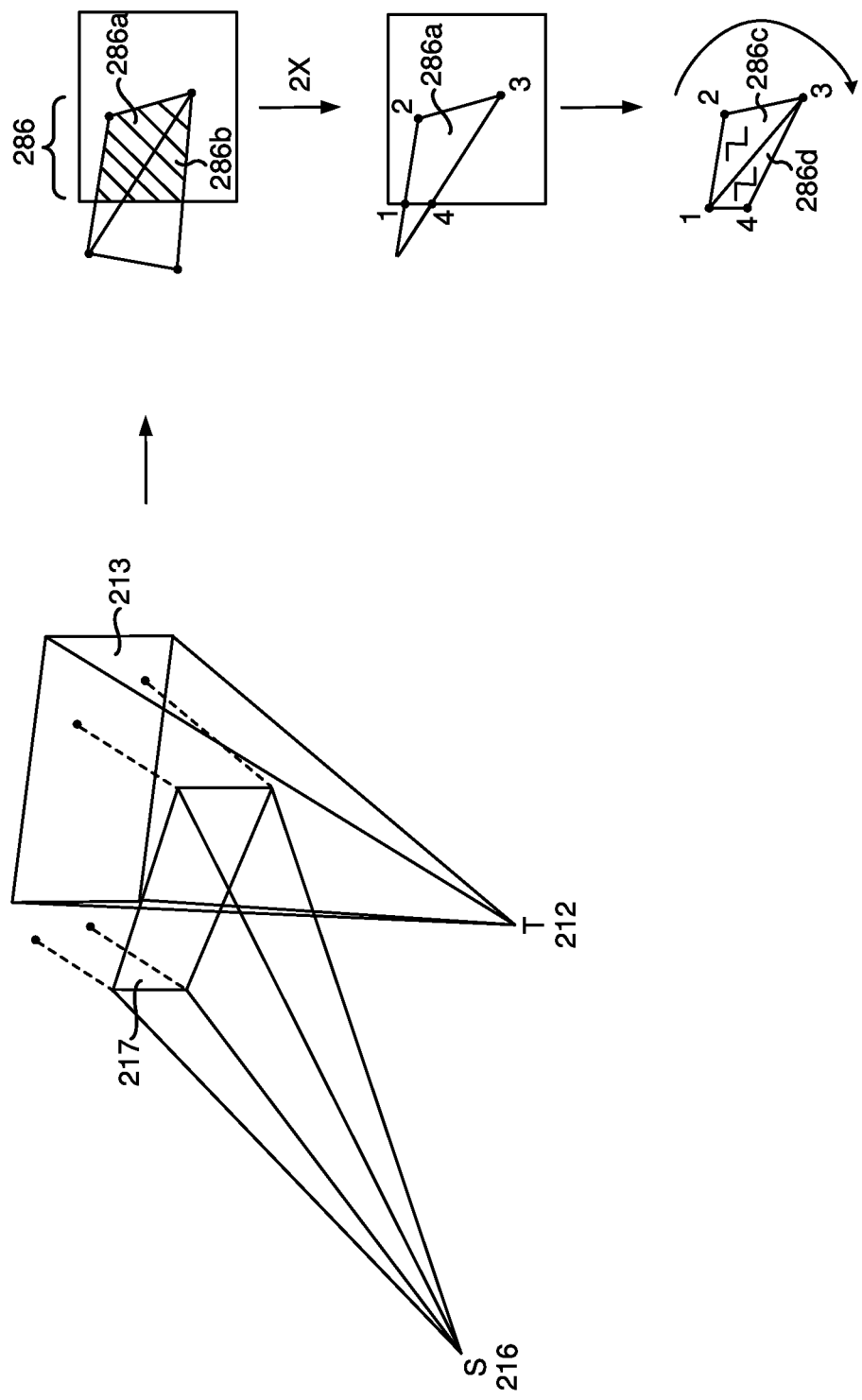
FIG. 2D is a diagram that illustrates a reprojection of a captured plane onto a target plane in accordance with some implementations.

FIG. 2D is a diagram that illustrates a reprojection operation in accordance with some implementations. In the example of FIG. 2D, the target POV 212 is associated with a target plane 213. FIG. 2D illustrates a source POV 216 (e.g., an existing POV) that is associated with a captured plane 217. The captured plane 217 is associated with known pixel values. In various implementations, the content presentation engine 200 (e.g., the shader 240, for example, the warper 250) determines pixel values for the target plane 213 by re-projecting the known pixel values of the captured plane 217 onto the target plane 213.

As illustrated in FIG. 2D, in some implementations, the content presentation engine 200 (e.g., the shader 240, for example, the warper 250) identifies an overlapping region 286 (indicated by the cross-hatching in FIG. 2D) between the target plane 213 and the captured plane 217. In some implementations, computing re-projection values for the entire overlapping region 286 may be computationally intensive. As such, in some implementations, the content presentation engine 200 (e.g., the warper 250) determines re-projection values for a first portion of the overlapping region 286 and determines re-projection values for a second portion of the overlapping region 286 based on the re-projection values for the first portion. In the example of FIG. 2D, the content presentation engine 200 partitions the overlapping region 286 into a first overlapping subregion 286a and a second overlapping subregion 286b. The content presentation engine 200 further partitions the first overlapping subregion 286a into a third overlapping subregion 286c and a fourth overlapping subregion 286d. In some implementations, the content presentation engine 200 determines re-projection values for the third overlapping subregion 286c and determines re-projection values for the fourth overlapping subregion 286d based on the re-projection values for the third overlapping subregion 286c. For example, the content presentation engine 200 determines the re-projection values for the third overlapping subregion 286c by mirroring the re-projection values for the fourth overlapping subregion 286d.

Figure 3:
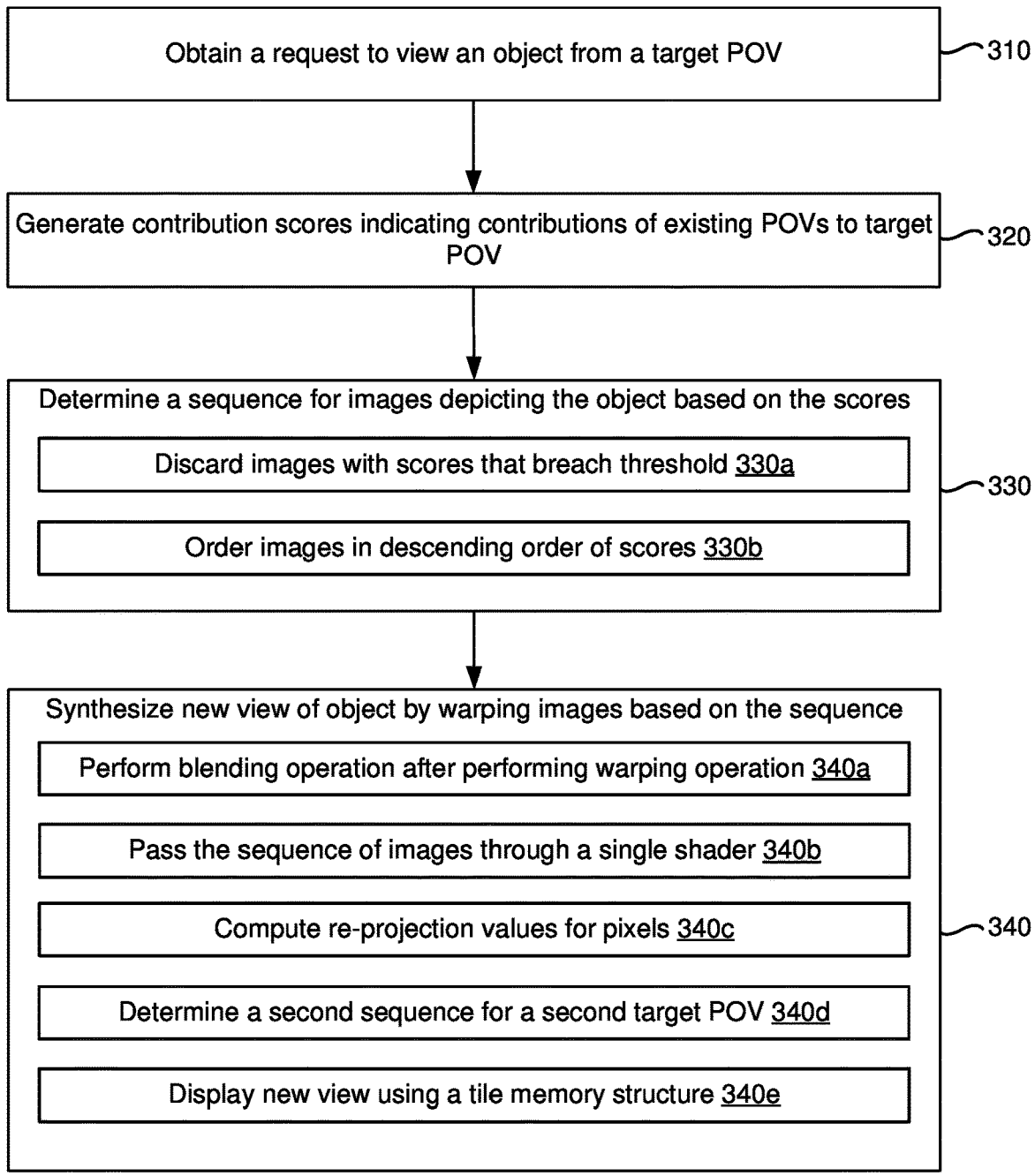
FIG. 3 is a flowchart representation of a method of synthesizing a new view of an object in accordance with some implementations.

FIG. 3 is a flowchart representation of a method 300 for synthesizing a new view of an object. In various implementations, the method 300 is performed by a device (e.g., the electronic device 100 shown in FIGS. 1A-1F, or the content presentation engine 200 shown in FIGS. 1A-2A). In some implementations, the method 300 is performed by processing logic, including hardware, firmware, software, or a combination thereof. In some implementations, the method 300 is performed by a processor executing code stored in a non-transitory computer-readable medium (e.g., a memory).

As represented by block 310, in some implementations, the method 300 includes obtaining a request to view an object from a target point-of-view (POV). For example, as described in relation to FIG. 1C, the electronic device 100 receives a request to view the object 112 from the first target POV 140. In some implementations, the object is represented in a plurality of images captured from corresponding POVs that are different from the target POV. For example, as shown in FIG. 1A, the object 12 is represented in the set of images 120 that have been captured from the POVs 130-1, 130-2, 130-3, 130-4 and 130-5 that are different from the first target POV 140. In some implementations, the method 300 includes detecting a voice command specifying the request (e.g., a voice command spoken by the user 20 shown in FIGS. 1A-1F). In some implementations, the method 300 includes detecting a user input manipulating a position of a rig (e.g., a virtual rig, for example, a virtual camera) associated with the object 112. In some implementations, the method 300 includes receiving a request to generate a 360° view of the object from the images. In some implementations, the method 300 includes receiving a request to generate a 3D model of an object from 2D images of the object. In some implementations, the method 300 includes receiving a request to present a 2D object depicted in the images in an MR mode (e.g., an AR mode).

As represented by block 320, in some implementations, the method 300 includes generating respective contribution scores for the corresponding POVs indicative of respective contributions of the corresponding POVs to a view frustum of the target POV. For example, as shown in FIG. 1D, the content presentation engine 200 generates the first set of contribution scores 150 for the POVs 130-1, 130-2, 130-3, 130-4 and 130-5. In some implementations, the method 300 includes determining the contribution scores based on amounts of overlap between the POVs associated with the images and the target POV. For example, as shown in FIG. 1D, the first contribution score 150-1 is greater than the fourth contribution score 150-4 because an amount of overlap between the first POV 130-1 and the first target POV 140 is greater than an amount of overlap between the fourth POV 130-4 and the first target POV 140. In some implementations, the method 300 includes determining the contribution scores based on amounts of overlaps between view frustums of the POVs associated with the images and a view frustum of the target POV. For example, as shown in FIG. 1D, the second contribution score 150-2 is greater than the third contribution score 150-3 because an amount of overlap between a view frustum of the second POV 130-2 and the view frustum 142 of the first target POV 140 is greater than an amount of overlap between a view frustum of the third POV 130-3 and the view frustum 142 of the first target POV 140.

As represented by block 330, in some implementations, the method 300 includes determining a sequence in which the plurality of images is ordered based on the respective contribution scores for the corresponding POVs. For example, as shown in FIG. 1D, the content presentation engine 200 determines the first sequence 160 for the images 120 based on the first set of contribution scores 150. In some implementations, the method 300 includes providing the images to a shader in an order specified by the sequence. For example, as discussed in relation to FIG. 2A, the shader 240 operates on the images 214 in the order specified by the sequence 232.

As represented by block 330a, in some implementations, determining the sequence includes discarding images with contribution scores that are lower than a threshold score. For example, as shown in FIG. 1E, the second sequence 162 does not include the fourth image 120-4 because the fourth contribution score 150-4 breaches (e.g., is lower than) the threshold contribution score 152. Since the second sequence 162 does not include the fourth image 120-4, the shader 240 does not operate on the fourth image 120-4. For example, the warper 250 does not perform a warping operation with respect to the fourth image 120-4 and the blender 260 does not perform a blending operation with respect to the fourth image 120-4. In some implementations, the method 300 includes forgoing determination of re-projection values for images that are associated with contribution scores that are lower than a threshold contribution score. In some implementations, forgoing the warping operation for images that are associated with contribution scores lower than the threshold contribution score tends to conserve computing resources associated with performing the warping operation.

As represented by block 330b, in some implementations, determining the sequence includes ordering the images such that an image with the greatest contribution score is at the beginning of the sequence and an image with the lowest contribution score is at the end of the sequence. For example, as shown in FIG. 1D, the first image 120-1 and the second image 120-2 are at the beginning of the first sequence 160 because the first contribution score 150-1 and the second contribution score 150-2 are the highest scores among the first set of contribution scores 150, and the fourth image 120-4 is at the end of the first sequence 160 because the fourth contribution score 150-4 is the lowest score among the first set of contributions scores 150. In some implementations, the method 300 includes ordering the images in a descending order of their contribution scores.

As represented by block 340, in some implementations, the method 300 includes synthesizing a new view of the object corresponding to the target POV by performing a warping operation to the plurality of images in accordance with the sequence. For example, as shown in FIG. 2B, the content presentation engine 200 synthesizes the new view 270a by performing warping operations 252a, 252b, . . . , and 252n on the images 214a, 214b, . . . , 214n in the order specified by the sequence 232a.

As represented by block 340a, in some implementations, synthesizing the new view includes performing a blending operation immediately after performing the warping operation. For example, as shown in FIG. 2B, the content presentation engine 200 (e.g., the shader 240, for example, the blender 260) performs the blending operations 262a, 262b, . . . , and 262n immediately after performing the warping operations 252a, 252b, . . . , and 252n, respectively. In some implementations, performing the blending operation includes utilizing a blending function. In some implementations, the blending function blends a previous value of a pixel with a new value of the pixel. In some implementations, the blending function uses a blending weight for each pixel. In some implementations, the blending weight (BW) for each pixel is defined by the following mathematical expression:

$$BW = e^{-\alpha S} * e^{\beta A} * e^{-\mu(1-C)} \quad \text{(Expression 1)}$$

As illustrated in expression (1), in some implementations, the blending weight (BW) is a function of a stretched factor S, a stretched factor parameter α, an alpha channel A, an alpha channel parameter β, a confidence value C, a confidence parameter μ, a depth value D and a depth parameter λ.

In some implementations, the method 300 includes blending previously written color, depth, blending weight and confidence values. In some implementations, the method 300 includes comparing a depth of a current pixel with a pixel in an attachment. In some implementations, the method 300 includes calculating a normalized blending weight based on depth. In some implementations, the method 300 includes computing the normalized blending weight ($W_f$) in accordance with the following mathematical expression:

(Expression 2)

$$W_f = \text{clamp}\left(\frac{BW_f}{BW_f + BW_b * e^{\lambda\left(\frac{1}{D_f+\varepsilon} - \frac{1}{D_b+\varepsilon}\right)} + \varepsilon} * e^{\mu(C_f - C_b)}, 0, 1\right)$$

$$W_b = 1 - W_f$$

In some implementations, the method 300 includes updating blended values (e.g., depth value D, blending weight BW, color and confidence values) in tile memory in accordance with the following mathematical expressions:

$$D = W_f D_f + W_b D_b \quad \text{(Expression 3)}$$

$$BW = BW_f e^{\lambda(D-D_f)} + BW_b e^{\lambda(D_b-D)} \quad \text{(Expression 4)}$$

$$Color = W_f Color_f + W_b Color_b \quad \text{(Expression 5)}$$

$$Confidence = W_f Confidence_f + W_b Confidence_b \quad \text{(Expression 6)}$$

As represented by block 340b, in some implementations, synthesizing the new view includes passing the sequence of the plurality of images through a single shader that performs the warping operation and the blending operation in succession. For example, as shown in FIGS. 2A-2C, the images 214 are passed through the shader 240 that performs the warping and blending operations on the images 214. In some implementations, the single shader includes a shared tile shader that uses tile memory and a shared attachment that is used by the warping operation associated with each image in the sequence. For example, as shown in FIGS. 2B and 2C, the shader 240 uses a shared attachment in order to conserve computing resources associated with using multiple attachments.

As represented by block 340c, in some implementations, performing the warping operation on a particular image includes calculating a re-projection value for each pixel based on a pixel value encoded in the particular image. For example, as shown in FIG. 2D, the content presentation engine 200 computes re-projection values for the overlapping region 286 based on known pixel values corresponding to the captured plane 217.

In some implementations, the method 300 includes forgoing the calculation of the re-projection value for pixels that are associated with a depth value that is less than a depth threshold and a confidence score that is greater than a confidence threshold. For example, if a particular pixel has a relatively close depth and a relatively high confidence, the content presentation engine 200 forgoes calculating the re-projection value for that particular pixel in order to conserve computing resources associated with calculating re-projection values.

As represented by block 340d, in some implementations, the method 300 includes receiving a second request to view the object from a second target POV, and determining a second sequence of the plurality of images that is different from the sequence. For example, if the user moves the virtual camera to provide a second target POV, the order in which the images are warped and blended changes to reflect the contribution of the existing POVs to the second target POV. For example, as shown in FIG. 1F, the content presentation engine 200 determines the third sequence 182 for the second target POV 170.

As represented by block 340e, in some implementations, the method 300 includes displaying the new view using a tile memory structure. In some implementations, using the tile memory structure includes partitioning a display area into tiles and performing an operation (e.g., warping and blending operations) on some tiles while forgoing performance of the operation on remainder of the tiles. As such, using a tile memory structure conserves computing resources by forgoing performance of an operation on some tiles.

Figure 4:
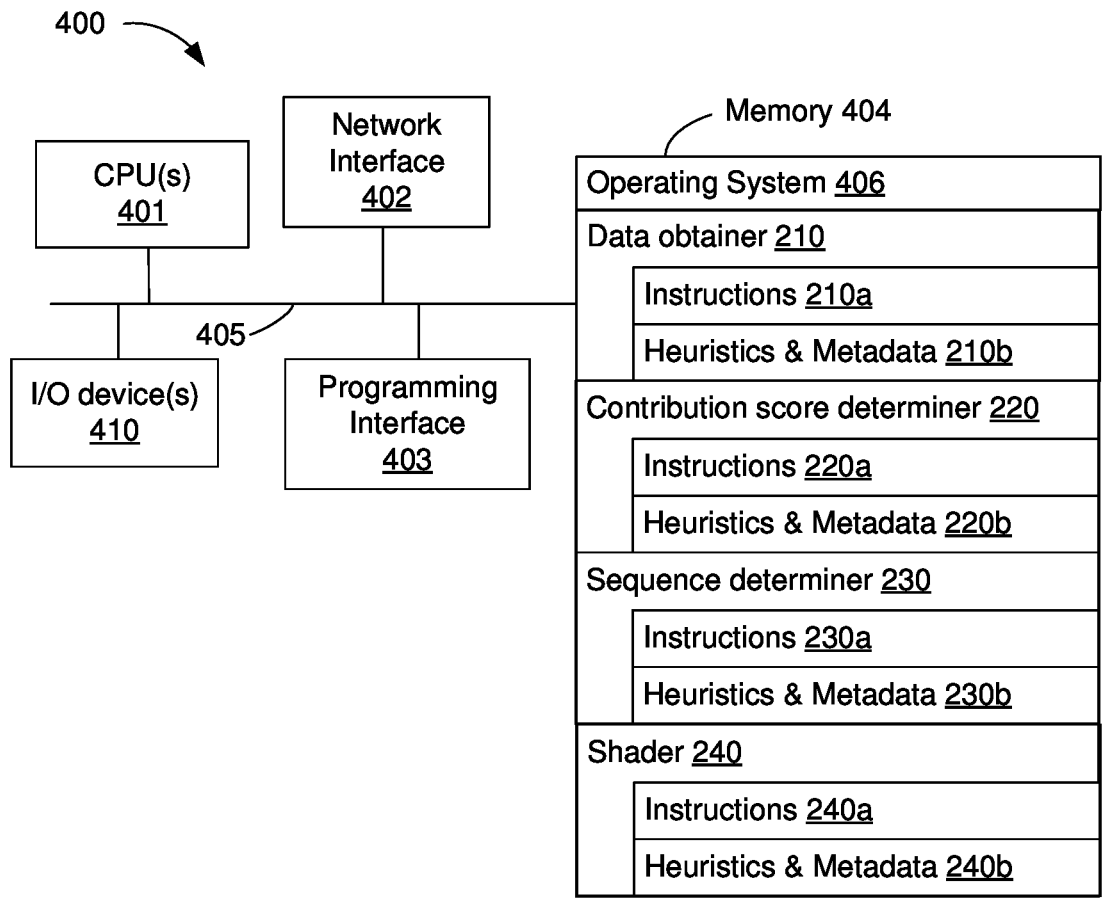
FIG. 4 is a block diagram of a device that synthesizes a new view of an object in accordance with some implementations.

FIG. 4 is a block diagram of a device 400 in accordance with some implementations. In some implementations, the device 400 implements the electronic device 100 shown in FIGS. 1A-1F, and/or the content presentation engine 200 shown in FIGS. 1A-2A. While certain specific features are illustrated, those of ordinary skill in the art will appreciate from the present disclosure that various other features have not been illustrated for the sake of brevity, and so as not to obscure more pertinent aspects of the implementations disclosed herein. To that end, as a non-limiting example, in some implementations the device 400 includes one or more processing units (CPUs) 401, a network interface 402, a programming interface 403, a memory 404, one or more input/output (I/O) devices 410, and one or more communication buses 405 for interconnecting these and various other components.

In some implementations, the network interface 402 is provided to, among other uses, establish and maintain a metadata tunnel between a cloud hosted network management system and at least one private network including one or more compliant devices. In some implementations, the one or more communication buses 405 include circuitry that interconnects and controls communications between system components. The memory 404 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 404 optionally includes one or more storage devices remotely located from the one or more CPUs 401. The memory 404 comprises a non-transitory computer readable storage medium.

In some implementations, the memory 404 or the non-transitory computer readable storage medium of the memory 404 stores the following programs, modules and data structures, or a subset thereof including an optional operating system 406, the data obtainer 210, the contribution score determiner 220, the sequence determiner 230 and the shader 240. In various implementations, the device 400 performs the method 300 shown in FIG. 3.

In some implementations, the data obtainer 210 obtains a request to view an object from a target POV (e.g., the target POV 212 shown in FIG. 2A). In some implementations, the data obtainer 210 performs at least some of the operation(s) represented by block 310 in FIG. 3. To that end, the data obtainer 210 includes instructions 210a, and heuristics and metadata 210b.

In some implementations, the contribution score determiner 220 generates contribution scores for POVs associated with images depicting the object. In some implementations, the contribution score determiner 220 performs the operation(s) represented by block 320 in FIG. 3. To that end, the contribution score determiner 220 includes instructions 220a, and heuristics and metadata 220b.

In some implementations, the sequence determiner 230 determines a sequence for the images based on the contribution scores associated with the images. In some implementations, the sequence determiner 230 performs the operation(s) represented by block 330 in FIG. 3. To that end, the sequence determiner 230 includes instructions 230a, and heuristics and metadata 230b.

In some implementations, the shader 240 performs warping and blending operations on the images in accordance with the sequence determined by the sequence determiner 230. In some implementations, the shader 240 performs the operations represented by block 340 in FIG. 3. To that end, the shader 240 includes instructions 240a, and heuristics and metadata 240b.

In some implementations, the one or more I/O devices 410 include an audio sensor (e.g., a microphone) for detecting a speech input (e.g., a voice command that indicates a target POV, for example, the first target POV 140 shown in FIG. 1C). In some implementations, the one or more I/O devices 410 include an image sensor (e.g., a camera) to capture image data (e.g., the images 120 shown in FIGS. 1A-1F). In some implementations, the one or more I/O devices 410 include a display for displaying a new view generated by the device 400 (e.g., the new view 270 shown in FIG. 2A). In some implementations, the one or more I/O devices 410 include an input device (e.g., a touchscreen display, a trackpad, a mouse, a keyboard, etc.).

In various implementations, the one or more I/O devices 410 include a video pass-through display which displays at least a portion of a physical environment surrounding the device 400 as an image captured by a scene camera. In various implementations, the one or more I/O devices 410 include an optical see-through display which is at least partially transparent and passes light emitted by or reflected off the physical environment.

It will be appreciated that FIG. 4 is intended as a functional description of the various features which may be present in a particular implementation as opposed to a structural schematic of the implementations described herein. As recognized by those of ordinary skill in the art, items shown separately could be combined and some items could be separated. For example, some functional blocks shown separately in FIG. 4 could be implemented as a single block, and the various functions of single functional blocks could be implemented by one or more functional blocks in various implementations. The actual number of blocks and the division of particular functions and how features are allocated among them will vary from one implementation to another and, in some implementations, depends in part on the particular combination of hardware, software, and/or firmware chosen for a particular implementation.

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

What is claimed is:

1. A method comprising:
at a device including a non-transitory memory and one or more processors coupled with the non-transitory memory:
obtaining a request to view an object from a target point-of-view (POV), wherein the object is represented in a plurality of images captured from corresponding POVs that are different from the target POV;
generating respective contribution scores for the corresponding POVs, wherein each contribution score is a function of an amount of overlap between a view frustum of the corresponding POV and a view frustum of the target POV;
determining a sequence in which the plurality of images is ordered based on the respective contribution scores for the corresponding POVs; and
synthesizing a new view of the object corresponding to the target POV by:
performing a warping operation to the plurality of images in accordance with the sequence in order to generate sets of re-projection values; and
selecting pixel values for the target POV from the sets of re-projection values by inputting the sets of re-projection values into a decision function and receiving the pixel values for the target POV as an output of the decision function.

2. The method of claim 1, wherein determining the sequence includes discarding a subset of the plurality of images in response to the subset being associated with contribution scores that are lower than a threshold score.

3. The method of claim 1, wherein determining the sequence includes ordering the plurality of images such that a first one of the plurality of images associated with the greatest contribution score is placed at a beginning of the sequence and a second one of the plurality of images associated with the lowest contribution score is placed at an end of the sequence.

4. The method of claim 1, wherein synthesizing the new view includes performing a blending operation subsequent to performing the warping operation.

5. The method of claim 4, wherein synthesizing the new view includes passing the sequence of the plurality of the images through a single shader that performs the warping operation and the blending operation in succession.

6. The method of claim 5, wherein the single shader includes a shared tile shader that uses tile memory and a shared attachment for performing the warping operation associated with each image in the sequence.

7. The method of claim 4, wherein performing the blending operation includes utilizing a blending function.

8. The method of claim 7, wherein the blending function blends a previous value of a pixel with a new value of the pixel.

9. The method of claim 7, wherein the blending function uses a blending weight for each pixel that is defined by $BW=e^{-\alpha s}*e^{\beta A}*e^{-\mu(1-C)}$, wherein BW represents the blending weight, S represents a stretched factor, $\alpha$ represents a stretched factor parameter, A represents an alpha channel, $\beta$ represents an alpha channel parameter, C represents a confidence value and $\mu$ represents a confidence parameter.

10. The method of claim 1, wherein performing the warping operation on a particular image of the plurality of images includes calculating a re-projection value for each pixel based on a pixel value encoded in the particular image.

11. The method of claim 10, further comprising forgo calculating re-projection values for pixels that are associated with a depth value that is less than a depth threshold and a confidence score that is greater than a confidence threshold.

12. The method of claim 1, further comprising:
receiving a second request to view the object from a second target POV; and
determining a second sequence of the plurality of images that is different from the sequence.

13. The method of claim 1, wherein the device further includes a display, and wherein the method further comprises displaying the new view on the display.

14. The method of claim 13, wherein the displaying includes displaying the new view using a tile memory structure.

15. A device comprising:
one or more processors;
a non-transitory memory; and
one or more programs stored in the non-transitory memory, which, when executed by the one or more processors, cause the device to:
obtain a request to view an object from a target point-of-view (POV), wherein the object is represented in a plurality of images captured from corresponding POVs that are different from the target POV;
generate respective contribution scores for the corresponding POVs, wherein each contribution score is a function of an amount of overlap between a view frustum of the corresponding POV and a view frustum of the target POV;
determine a sequence in which the plurality of images is ordered based on the respective contribution scores for the corresponding POVs; and
synthesize a new view of the object corresponding to the target POV by:
performing a warping operation to the plurality of images in accordance with the sequence in order to generate sets of re-projection values; and
selecting pixel values for the target POV from the sets of re-projection values by inputting the set of re-projection values into a decision function and receiving the pixel values for the target POV as an output of the decision function.

16. The device of claim 15, wherein determining the sequence includes discarding a subset of the plurality of images in response to the subset being associated with contribution scores that are lower than a threshold score.

17. The device of claim 15, wherein determining the sequence includes ordering the plurality of images such that a first one of the plurality of images associated with the greatest contribution score is placed at a beginning of the sequence and a second one of the plurality of images associated with the lowest contribution score is placed at an end of the sequence.

18. The device of claim 15, wherein synthesizing the new view includes performing a blending operation subsequent to performing the warping operation.

19. The device of claim 18, wherein synthesizing the new view includes passing the sequence of the plurality of the images through a single shader that performs the warping operation and the blending operation in succession.

20. A non-transitory memory storing one or more programs, which, when executed by one or more processors of a device, cause the device to:
obtain a request to view an object from a target point-of-view (POV), wherein the object is represented in a plurality of images captured from corresponding POVs that are different from the target POV;
generate respective contribution scores for the corresponding POVs, wherein each contribution score is a function of an amount of overlap between a view frustum of the corresponding POV and a view frustum of the target POV;
determine a sequence in which the plurality of images is ordered based on the respective contribution scores for the corresponding POVs; and
synthesize a new view of the object corresponding to the target POV by:
performing a warping operation to the plurality of images in accordance with the sequence in order to generate sets of re-projection values; and
selecting pixel values for the target POV from the sets of re-projection values by inputting the set of re-projection values into a decision function and receiving the pixel values for the target POV as an output of the decision function.

* * * * *